United States Patent [19]
Shimada et al.

[11] Patent Number: 5,832,950
[45] Date of Patent: *Nov. 10, 1998

[54] FUEL INTERRUPTION MEANS OF FUEL TANK

[75] Inventors: Shinya Shimada; Hiroshi Takaki; Yujiro Hayashi, all of Soja, Japan

[73] Assignee: OM Corporation, Okayama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 711,044

[22] Filed: Sep. 10, 1996

[30] Foreign Application Priority Data

Sep. 11, 1995 [JP] Japan .................................. 7-232888

[51] Int. Cl.$^6$ .................................................. F16K 24/04
[52] U.S. Cl. .............................. 137/202; 137/43; 137/629
[58] Field of Search ............................... 137/43, 202, 629

[56] References Cited

U.S. PATENT DOCUMENTS

| | | | |
|---|---|---|---|
| 4,982,757 | 1/1991 | Ohasi et al. ............................ | 137/202 |
| 5,044,389 | 9/1991 | Gimby . | |
| 5,261,439 | 11/1993 | Harris . | |
| 5,313,978 | 5/1994 | Takaki et al. . | |
| 5,392,804 | 2/1995 | Kondo et al. ........................... | 137/202 |
| 5,439,023 | 8/1995 | Horikawa ................................ | 137/202 |
| 5,443,561 | 8/1995 | Sakata et al. .......................... | 137/202 |
| 5,590,697 | 1/1997 | Benjey et al. ...................... | 137/202 X |
| 5,638,856 | 6/1997 | Ohaski et al. .......................... | 137/202 |

*Primary Examiner*—Gerald A. Michalsky
*Attorney, Agent, or Firm*—Koda & Androlia

[57] ABSTRACT

In a fuel interruption device for a fuel tank, a main valve is prevented from opening as a result of the action of an auxiliary valve during closure of the main valve; and more specifically, an auxiliary valve which is caused to move up and down by a float and a main valve which moves up and down in linkage with the up and down movement of the auxiliary valve are accommodated inside a casing which allows the inflow and outflow of liquid fuel and is provided at the end of a passage which connects the fuel tank and canister; a linking projection is provided on one of the valves, that is, either the auxiliary valve or the main valve, so that the main valve moves in linkage with the auxiliary valve in an action that is either advanced or retarded within a predetermined range, and a projection regulating groove into which the linking projection is inserted so that the projection can change its position within the range is formed in the other valve; and auxiliary valve seat and main valve seat open independently in the upper portion of the casing or in the end of the passage.

2 Claims, 6 Drawing Sheets

FUEL INTERRUPTION MEANS OF FUEL TANK

BACKGROUND OF THE INVENTION

The present invention relates to a fuel interruption means which is installed in a passage that allows vaporized fuel to escape from a fuel tank into a canister and which prevents the inflow of liquid fuel into the canister.

Fuel interruption means are installed in the passages which connects fuel tanks and canisters and ordinarily at the connecting point of the fuel tank and passage; and in addition, such means utilize the buoyancy of residual fuel inside the fuel tank in order to open and close a float valve, thus preventing the outflow of liquid fuel into the canister. In conventional fuel interruption means, the float valve is divided into a main valve which has a large opening area and an auxiliary valve which has a small opening area in order to insure reliable operation of the float valve even in cases where the difference between the internal pressure of the fuel tank and the pressure on the canister is large; and such fuel interruption means have become increasingly common (U.S. Pat. No. 5,261,439, U.S. Pat. No. 5,313,978). The relationship between the main valve and the auxiliary valve in the present invention is based on such a difference in the size of the opening area.

For example, the means disclosed in U.S. Pat. No. 5,313,978 operates so that when the vehicle tilts and the level of the liquid fuel reaches the fuel interruption means, an auxiliary valve which is formed integral with a float pushes the main valve upward so as to close the passage; and when the vehicle is back to its normal attitude and the fuel surface is lowered, even if there is a large pressure difference between the fuel tank and the canister so that the main valve tends not to open, the auxiliary valve first opens so that the pressure difference is alleviated, and then the main valve is opened. Thus, the means has an improved reliability of the valve opening and closing operation.

SUMMARY OF THE INVENTION

The fuel interruption means described in U.S. Pat. No. 5,313,978, the auxiliary valve, rather than functioning as an ordinary valve, functions as a driving force which pushes the main valve upward through the buoyancy of the float when the main valve is to be closed, and it functions as a so-called "pressure relief hole" when the main valve is to be opened. Accordingly, the auxiliary valve seat is installed in the main valve; and since the sealing characteristics of the auxiliary valve must be insured, the structure is naturally designed so that the auxiliary valve and main valve are in tight contact. From this fact, it is understood that the main valve and the auxiliary valve are in such a relationship that the behavior of each valve influences the other via the respective valve materials at least when the passage is closed.

Accordingly, in cases where the vehicle jolts violently so that a violent wave motion is generated in the liquid fuel inside the fuel tank, the fluctuation of the liquid fuel would cause the auxiliary valve to move even if the main valve is deliberately close; and as a result, the behavior of the auxiliary valve causes the main valve to move as well, thus opening the main valve and allowing the flow of liquid fuel into the canister.

Originally, the reason for installing both a main valve and an auxiliary valve is to insure an accurate and reliable function of the main valve, which has an opening area large enough to allow vaporized fuel to pass through in conformity with fluctuations in the liquid fuel by installing two types of large and small valves in parallel in the passage that connects the fuel tank and the canister. Accordingly, in view of the above problem, it was decided to re-examine the relationship between the main valve and the auxiliary valve from the standpoint of causing the auxiliary valve to function not as a mere driving force or pressure relief hole for the main valve but rather as a small-diameter valve in its own right, so that the main valve and auxiliary valve respectively prevent the inflow of the liquid fuel into the canister.

The results of the examination led to the creation of a fuel interruption means for a fuel tank in which: an auxiliary valve which is caused to move upward and downward by a float and a main valve which moves upward and downward in linkage with the upward and downward movement of the auxiliary valve are accommodated inside a casing which is provided at the end of a passage connecting the fuel tank and canister and allows the inflow and outflow of liquid fuel; a linking projection is provided on one of the valves, that is, either on the auxiliary valve or on the main valve, so that the main valve moves in linkage with the auxiliary valve in such an action that is either advanced or retarded within a predetermined range, and a projection regulating groove into which the linking projection is inserted so that the projection can change the position within such a predetermined range is formed in the other valve; and an auxiliary valve seat and a main valve seat are independently opened in the upper portion of the casing or in the end of the passage.

In the present invention, the auxiliary valve and the main valve can make relative action changes within a predetermined range, ordinarily in the vertical direction, and also the auxiliary valve seat and main valve seat are independently provided, so that even if one valve is opened, the other valve will not open; more specifically, even if the auxiliary valve is opened, the main valve will not open. When it is necessary to avoid the relative action changes of the main valve and auxiliary valve, it is not very effective to push the main valve upward by the auxiliary valve that is caused to rise by a float as in conventional means.

Accordingly, so as to drive the main valve upward by a spring and to push the main down under ordinary conditions, it is preferable to design so that a linking projection or projection regulating groove provided on the main valve is engaged with a projection regulating groove or linking projection provided on the auxiliary valve, the float causes the auxiliary valve to rise as a result of an increase in the amount of liquid fuel inside the fuel tank or as a result of a wave action generated in the liquid level inside the fuel tank so as to release the engagement between the linking projection and projection regulating groove, thus raising the main valve by the spring.

For example, in one fuel interruption means: the main valve is a flattened hollow cylinder that has an annular upper end surface and an opened lower end surface (in other words, the main valve is formed as a doughnut-shaped valve which has a circular gap at the center), and a projection regulating groove which runs in the opening and closing direction is formed on the side surface of the main valve; the auxiliary valve has a valve which is formed on the upper surface of a solid cylinder and projects out loosely from the center of the upper surface of the main valve, and it also has a linking projection which is formed on the side surface of the auxiliary valve so as to be inserted into the projection regulating groove of the main valve; and an annular main valve seat and a circular auxiliary valve are formed concentrically at the end of a passage which opens into a casing that accommodates the main valve and auxiliary valve.

The main valve is driven upward by a spring which is installed between the upper surface of the valve body and the casing. Under ordinary conditions, in which the amount of liquid fuel inside the fuel tank is small, the linking projection of the auxiliary valve engages with the lower end of the projection regulating groove formed in the side surface of the valve body of the main valve, so that the main valve is pushed downward by the load of the auxiliary valve. The auxiliary valve is lifted by the buoyancy of the float so that the load is lessened or eliminated, and the main valve itself is caused to rise so as to close the main valve seat, and the auxiliary valve closes the auxiliary valve seat by way of the buoyancy of the float. Each of the main valve and auxiliary valve may be provided with a sealing if necessary.

The main valve and the auxiliary valve are linked together by inserting the linking projection into the projection regulating groove so that a variation in the relative attitudes of the valves is permitted within certain limitations. More specifically, in cases where the auxiliary valve moves upward or downward or to the left or right within the range defined by the projection regulating groove, the linking projection does not press against the inside edge of the projection regulating groove, and therefore, the main valve is not affected by the behavior of the auxiliary valve Furthermore, the main valve is driven upward by the spring, and the load of the auxiliary valve is applied to the projection regulating groove by the linking projection; and when, in such a case, the main valve and auxiliary valve are both raised, the linking projection is positioned in the middle of the projection regulating groove, thus allowing the auxiliary valve to act independently of the main valve within the range defined by the projection regulating groove.

Furthermore, the main valve seat and the auxiliary valve seat are provided completely independently of each other, and the auxiliary valve is raised by a float and the main valve is raised by a spring; accordingly, there is no contact between the two valves, the behavior of the auxiliary valve has no effect on the main valve. In other words, when the main valve and the auxiliary valve are both closed, the linking projection stays at near the intermediate position of the projection regulating groove, and the main valve and the auxiliary valve completely independently close the main valve seat and the auxiliary valve seat with a space in between; accordingly, one does not affect the other. The range in which the action of the auxiliary valve does not effect the main valve is determined by the positional relationship between the main valve seat and auxiliary valve seat, the respective shapes and sizes of the valve seats, the relationship between the linking projection and the projection regulating groove, and the shape and size of the projection regulating groove, etc.

In the fuel interruption means described above, the behavior of the auxiliary valve is prevented from influencing the main valve; and even if the auxiliary valve should open, the main valve remains closed. However, by forming the main valve or auxiliary valve with a more or less convex spherical surface shape, and by forming the main valve seat or auxiliary valve seat corresponding to the main valve or auxiliary valve so that the main valve seat or auxiliary valve seat has a more or less concave spherical surface shape which is in sliding contact with the main valve or auxiliary valve, it is possible, for example, to maintain the auxiliary valve in closed state even when the auxiliary valve has made its own behavior. Generally, the movement of main valves or auxiliary valves is a swinging movement which is caused by a liquid surface in which a wave action has been generated. Accordingly, by causing the main valve and the main valve seat or the auxiliary valve and the auxiliary valve seat to make sliding contact via the respective spherical surfaces, the main valve or auxiliary valve is allowed to pivot about the vicinity of each valve seat with the valves kept closed.

In the fuel interruption means of the present invention, as described above, the main valve which has a large opening area and the auxiliary valve which has a small opening area are installed independently and in parallel. Accordingly, the auxiliary valve, which in conventional means functions only as a pressure relief hole for the main valve, is endowed with an intrinsic valve function as a fuel interruption means, that is, a function which prevents the inflow of liquid fuel into the canister, while at the same time any mutual influence resulting from mutual action of the main valve and auxiliary valve is eliminated. Such a blocking of mutual action is optimally accomplished by making the auxiliary be raised and lowered by a float and the main valve be raised and lowered by a spring so that the respective movement is independent from each other. However, even in the case wherein the auxiliary valve is in contact with the main valve and pushes the main valve upward, a blocking of mutual action can be accomplished by reducing the amount of the contact.

Furthermore, by constructing the respective valves of the fuel interruption means of the present invention so that the valves have curved surfaces, it is possible to keep the valves closed even when the main valve or auxiliary valve behaves independently, thus preventing the inflow of liquid fuel into the canister with even greater reliability. Thus, the fuel interruption means that contains the main valve and auxiliary valve has a reliability of operation and can prevent the inflow of liquid fuel into the canister, which is the original object of the means, with greater assurance.

DETAILED DESCRIPTION OF THE INVENTION

Figure 1:
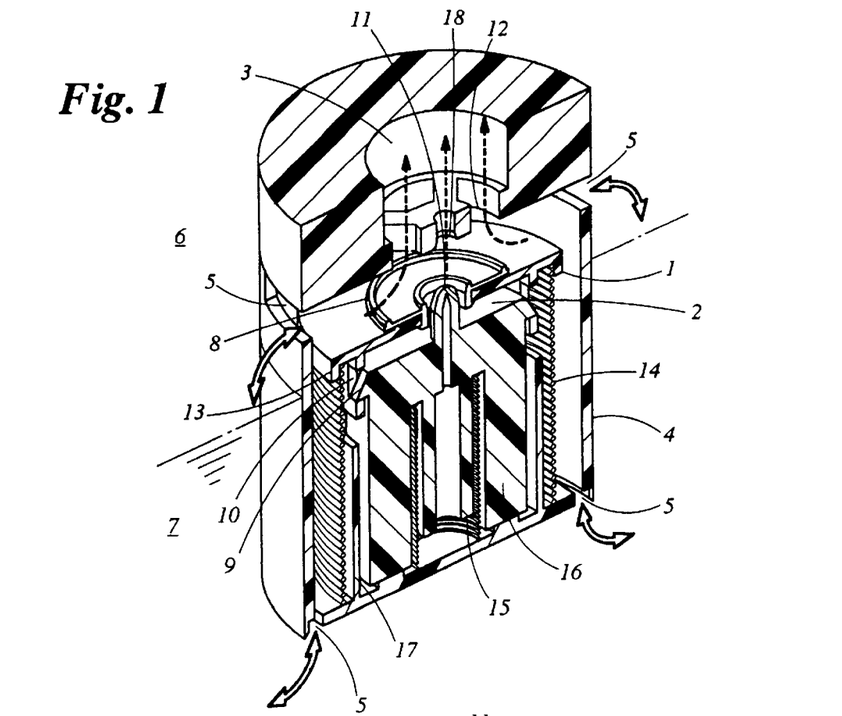
FIG. 1 is an exploded perspective diagram which illustrates the fuel interruption means of the present invention.
Figure 2:
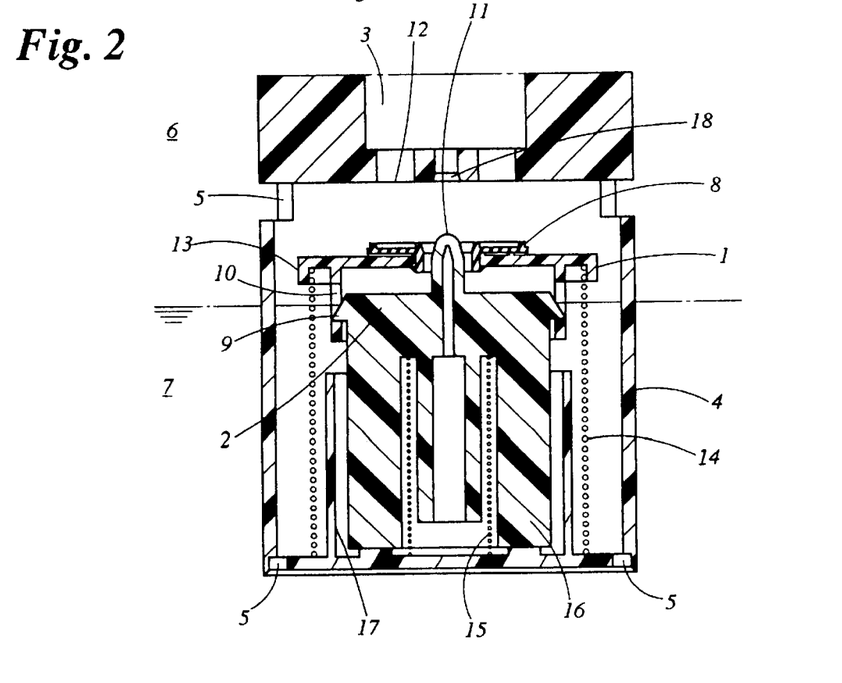
FIG. 2 is a perpendicular sectional view thereof showing the main valve and the auxiliary valve in an open state.
Figure 3:
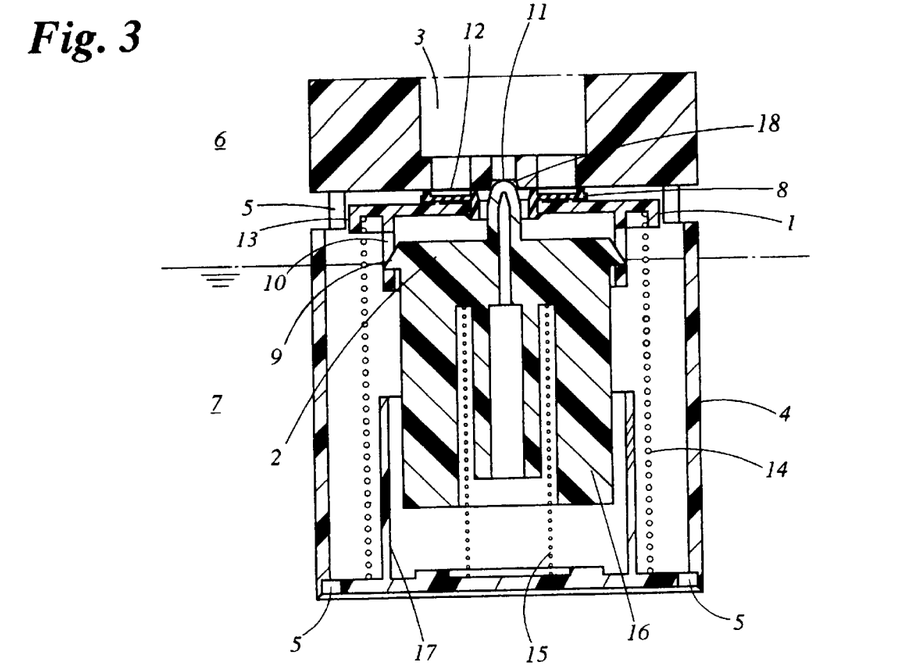
FIG. 3 is a perpendicular sectional view thereof showing a state in which only the main valve is closed.
Figure 4:
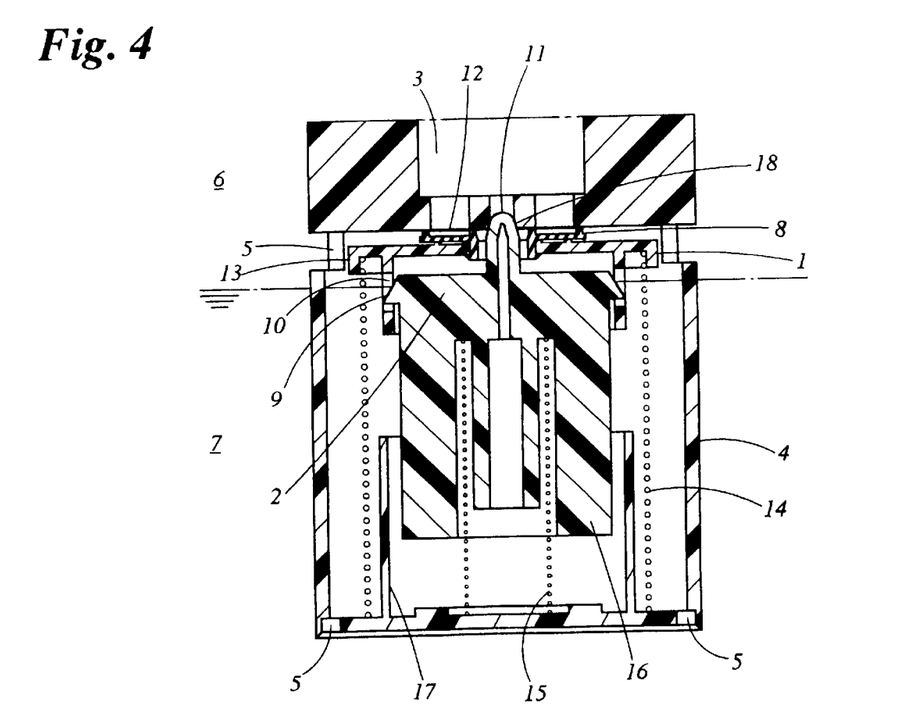
FIG. 4 is a perpendicular sectional view thereof showing a state in which the main valve and the auxiliary valve are both closed so that the passage is blocked.

Embodiments of the present invention will be described below with reference to the attached drawings. FIG. 1 is a longitudinally sectional perspective view showing the fuel interruption means of the present invention. FIGS. 2 through 4 are sectional views of the fuel interruption means of the present invention. In FIG. 1, a main valve 1 and an auxiliary valve 2 are both in an open state, and an end 3 of the passage leading to the canister (not shown in the figures) is opened so that vaporized fuel can escape into the canister (as indicated by the dotted arrows in FIG. 1). The casing 4 is provided with inlet/outlets 5 for liquid fuel in the side surfaces and bottom surface thereof so that the inflow and outflow (as indicated by the thick double-headed arrows in FIG. 1) of liquid fuel between the interior of the casing 4 and the interior of the fuel tank 6 is assured. The fuel interruption means is constructed so that when liquid fuel fills the fuel tank or a wave action is generated in the surface of the liquid fuel 7 due to vibration of the vehicle, etc., the liquid fuel 7 that flows into the casing 4 pushes the auxiliary valve 2 upward, thus reducing or eliminating the load of the auxiliary valve 2 applying onto the main valve 1, which is driven upward, so that the main valve 1 is allowed to rise.

The main valve 1 has a valve body structure in which the center of the upper surface of a flattened hollow cylinder whose bottom surface is open is punched out in circular form, and an annular seal 8 is attached thereto; in addition, a projection regulating groove 10 which engages with a linking projection of the auxiliary valve 9 is formed on the side surface of the main valve 1. A projecting end 11 of the auxiliary valve 2 protrudes in a loose state from the circular space located in the center of the seal 8. A main valve seat 12 located at the passage end 3 opens in circular form so as to correspond to the shape of the seal 8. In the main valve 1 of this example, a coil spring 14 (outside) is installed between the main valve 1 and the bottom surface of the casing 4 with the coil spring extending along a flange 13 formed on the outer circumference of the upper surface of the main valve 1, so that the main valve 1 is consistently urged upward. Ordinarily, however, the linking projection 9 is engaged with the projection regulating groove 10 so that the load of the auxiliary valve 2 is applied to the main valve 1, thus pushing the main valve 1 downward and opening the valve.

The auxiliary valve 2 is a thick cylinder which is obtained by hollowing out the interior of a float 16 which is an integral unit and accommodates a coil spring 15 inside thereof so that the coil spring 4 is installed between the auxiliary valve 2 and the bottom surface of the casing 4; and in addition, the auxiliary valve 2 has a valve having a smoothly curved projecting end 11 on the upper surface thereof. Furthermore, the auxiliary valve 2 is provided with the linking projection 9 which is formed on the side surface thereof so as to engage in sliding contact with the projection regulating groove 10. The coil spring 15 supplements the buoyancy of the float 16 against the load of the auxiliary valve 2 and acts to increase the response speed of the opening-and-closing action of the valve. In the present embodiment, the respective strengths of the coil springs 14 and 15 of the main valve 1 and of the auxiliary valve 2, respectively, are preferably selected and combined so that the main valve 1 which is driven upward by the coil spring 14 is pushed downward by the auxiliary valve 2, thus opening the valve, separating the main valve 1 from the auxiliary valve 2 in a floating state, so that the behaviors of the respective valves do not influence each other. Moreover, in order to insure the upward and downward motion which accompanies no shift in the horizontal direction, the auxiliary valve 2 is surrounded by a cylindrical guide 17 which is installed upright on the bottom surface of the casing 4.

Figure 5:
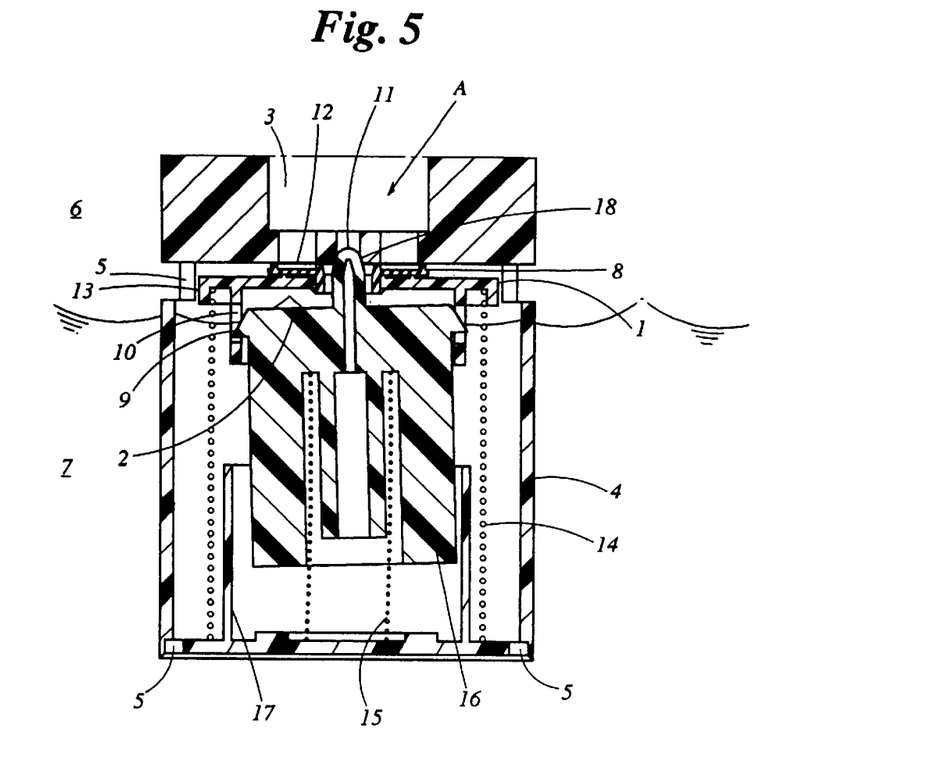
FIG. 5 is a perpendicular sectional view thereof showing the closed auxiliary valve pivoted about the valve seat.

The operation of this embodiment will be described with reference to the state of the liquid fuel 7 inside the fuel tank 6. FIG. 2 is a perpendicular cross-sectional view of the fuel interruption means which shows the state in FIG. 1, that is, a state in which the amount of liquid fuel 7 in the fuel tank 6 is small so that there is no danger of the inflow of liquid fuel from the passage end 3 into the canister and in which both the main valve 1 and the auxiliary valve 2 are open. FIG. 3 is a perpendicular cross-sectional view showing a state in which the level of the liquid fuel 7 has risen from the state shown in FIG. 2, and the auxiliary valve 2 is lifted by the buoyancy of the float 16 with the main valve 1 opened by the downward pushing action of the linking projection 9 so that only the main valve 1 is closed. FIG. 4 is a perpendicular cross-sectional view showing a state in which the auxiliary valve 2 has risen even further from the state shown in FIG. 3, so that the auxiliary valve 2 is closed also, thus closing off the passage end 3. FIG. 5 is a perpendicular cross-sectional view showing a state in which the auxiliary valve 2 in FIG. 4 has pivoted about the vicinity of the auxiliary valve seat 18 as a result of wave action generated in the surface of the liquid fuel 7.

As described above, in a state in which the amount of liquid fuel 7 is small, the linking projection 9 applies the entire load of the auxiliary valve 2 to the lower end of the projection regulating groove 10 so that the main valve 1 is pushed downward though the main valve 1 is driven upward by the coil spring 14. As a result, both the main valve 1 and the auxiliary valve 2 are open as shown in FIG. 2. In this state, even if some wave action is generated in the surface of the liquid fuel 7, there is little danger that liquid fuel 7 will flow into the canister from the passage end 3. Accordingly, the valve is fully opened so that vaporized fuel inside the fuel tank 6 is sufficiently able to escape into the canister.

When the amount of liquid fuel 7 is increased or when a wave action is generated in the surface of the liquid fuel 7 due to vibration, etc. of the vehicle, buoyancy constantly or instantaneously acts on the float 16 of the auxiliary valve 2, so that the load of the auxiliary valve 2 applied to the main valve 1 is either reduced or eliminated. As a result, the main valve 1 is pushed upward by the coil spring 14 so that the main valve seat 12 is closed as shown in FIG. 3. In order to close the main valve quickly in response to a wave action generated in the surface of the liquid fuel 7, it is necessary to appropriately set the relationship of the strengths and stroke values of the coil springs of the main valve and auxiliary valve, and the buoyancy of the float of the auxiliary valve, etc. In the present embodiment, the seal 8 of the main valve 1 completely closes off the main valve seat 12.

When the amount of liquid fuel 7 is increased even further from the state described above, or when the wave action generated in the surface of the liquid fuel 7 becomes even more violent, the linking projection 9 of the auxiliary valve 2 rises in the projection regulating groove 10 as a result of the buoyancy of the float 16, thus the auxiliary valve seat 18 is closed. In this state, the passage end 3 is completely closed off, so that the fuel tank 6 and canister can be completely separated from each other. The smoothly curved projecting end 11 of the auxiliary valve 2 enters into the auxiliary valve seat 18, so that the auxiliary valve seat 18 is completely closed.

Conventionally, there was such a danger that when wave action in the surface of the liquid fuel continues in the state shown in FIG. 5, though in this situation both the main valve and the auxiliary valve need to be closed, the float was moved by the motion of the liquid fuel, and the auxiliary valve pivoted about the vicinity of the auxiliary valve seat and opens, and furthermore, this action of the auxiliary valve was transmitted to the main valve so that even the main valve also opened. In the fuel interruption means of the present invention, on the other hand, as shown in FIG. 5, the main valve 1 and the auxiliary valve 2 are completely independent, so that the actions of the respective valves do not influence each other. Accordingly, even if the auxiliary valve 2 should pivot, the main valve 1 can be kept closed. In particular, the closure of the main valve 1 can be stably maintained by lifting the main valve 1 using the coil spring 14, thus pressing the seal 8 against the main valve seat 12, as in the present embodiment.

In the present embodiment, the range in which the main valve can be separated from the pivoting auxiliary valve is determined by the size of the central space in the annular upper surface of the main valve and the engaging relationship of the projection regulating groove and linking projection, etc. If these values are large, the main valve can be isolated from a correspondingly large action of the auxiliary valve; in such a case, however, it is necessary to increase the size of the fuel interruption means or to reduce the area of the main valve seat or auxiliary valve seat. Accordingly, the dimensions above should be determined in accordance with the desired performance of the fuel interruption means and the expected motion of the liquid fuel.

Figure 6:
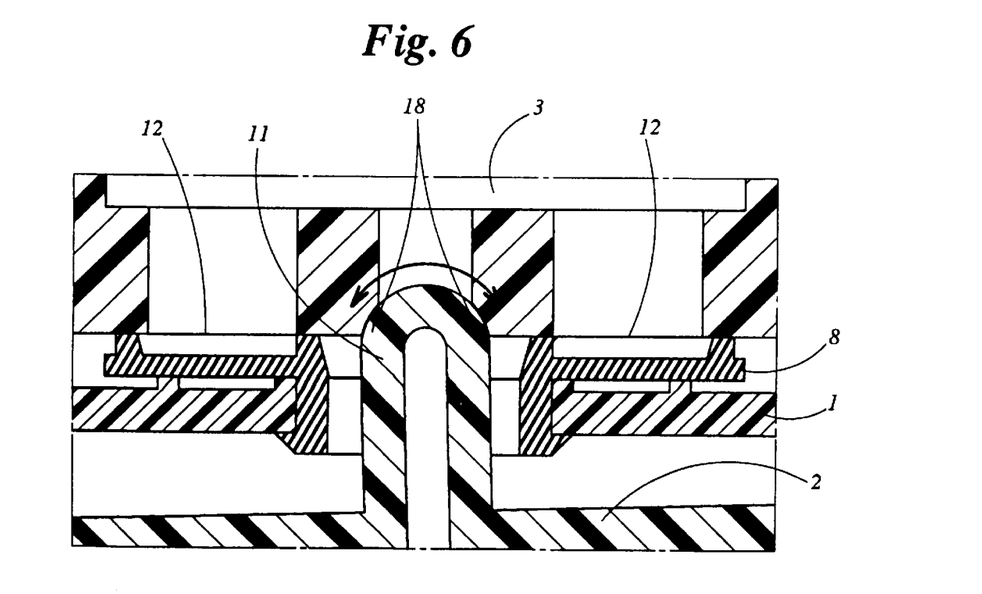
FIG. 6 is an enlarged corresponding view showing the portion indicated by arrow A in FIG. 5.

FIG. 6 is an enlarged view corresponding to the portion indicated by arrow A in FIG. 5 of the fuel interruption means in which the projecting end 11 of the auxiliary valve is formed into substantially a convex spherical shape, and the corresponding auxiliary valve seat 18 is formed into substantially a concave spherical shape. As seen from FIG. 6, the formation of the projecting end 11 of the auxiliary valve into a roughly convex spherical shape and the formation of the auxiliary valve seat 18 into a roughly concave spherical shape make it possible for the auxiliary valve 2 to pivot while the projecting end 11 is in a sliding contact with the auxiliary valve seat 18. As a result, the closure of the auxiliary valve 2 can be maintained so that the inflow of fuel into the canister is even more securely prevented. This is also a result of allowing a certain behavior of the auxiliary valve which is obtained by separating the main valve and auxiliary valve. Thus, in the fuel interruption means of the present invention, reliability is greatly improved compared to conventional means wherein some pivoting motion of auxiliary valves occur even though an attempt is made to suppress the action of the auxiliary valves by force, and, as a result, a slight gap is formed which leads to the danger of fuel flowing into the canister.

Figure 7:
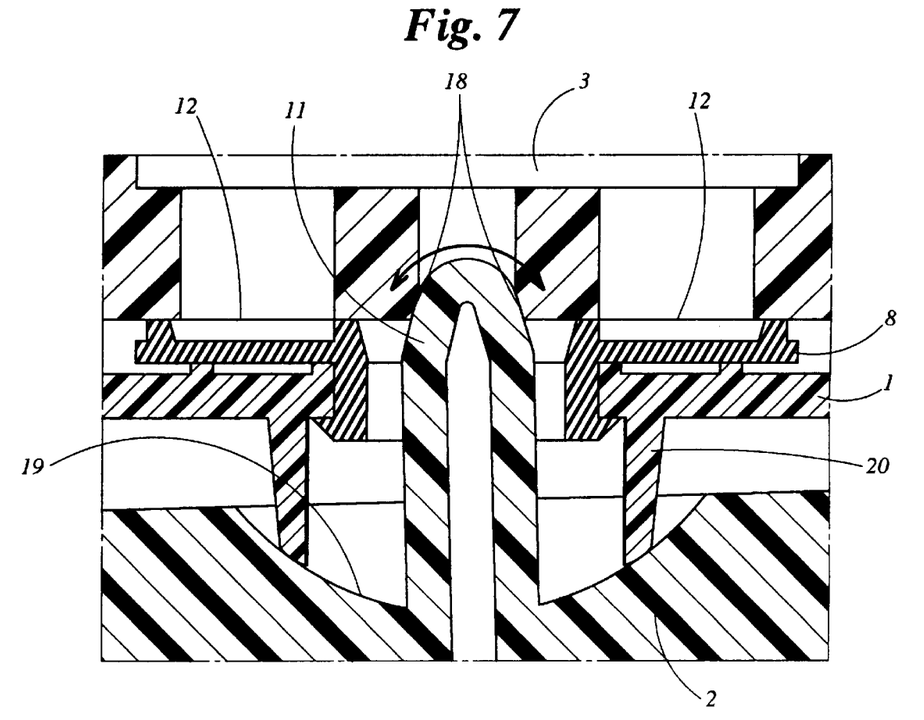
FIG. 7 is an enlarged corresponding view showing the portion indicated by arrow A in FIG. 5 in which the valve structure contains a main valve which is pushed upward by an auxiliary valve.

FIG. 7 is an enlarged view corresponding to the portion indicated by arrow A in FIG. 5 of a fuel interruption means that has the valve structure shown in FIG. 6, wherein a bowl-shaped curved supporting surface 19 is formed in the upper surface of the auxiliary valve 2, and a supporting projection 20 which projects downward from the main valve 1 makes sliding contact with this curved supporting surface 19. In this fuel interruption means, the main valve is not pushed upward by a coil spring; instead, the auxiliary valve 2 pushes the main valve 1 upward via the curved supporting surface 19 and supporting projection 20. Accordingly, contact between the auxiliary valve 2 and the main valve 1 is necessary. However, as shown in FIG. 7, such a contact is limited to the small area of the curved supporting surface 19 and supporting projection 20; and in addition, the auxiliary valve 2 pivots while the supporting projection 20 makes a sliding contact with the curved supporting surface 19 so that the action of the auxiliary valve 2 has no effect on the main valve 1. As a result, the danger that the main valve will open as a result of the action of the auxiliary valve 2 is reduced though not to the same extent as in the previously described fuel interruption means in which the main valve 1 is pushed upward by the spring 14 (see FIG. 1). The structure in which the main valve is pushed upward by a coil spring is most desirable from the standpoint of isolating the actions of the main valve and auxiliary valve from each other in the present invention; however, since coil springs are expensive, a structure in which the main valve is pushed upward by the auxiliary valve as in a conventional means may be used in order to reduce costs.

Figure 8:
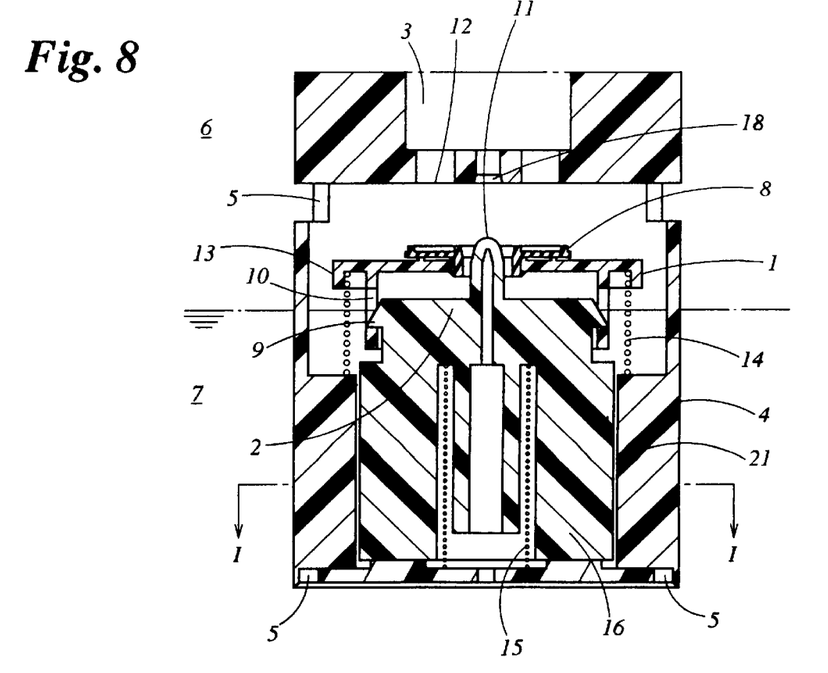
FIG. 8 is a perpendicular sectional view of another example thereof with the main valve and auxiliary valve opened.
Figure 9:
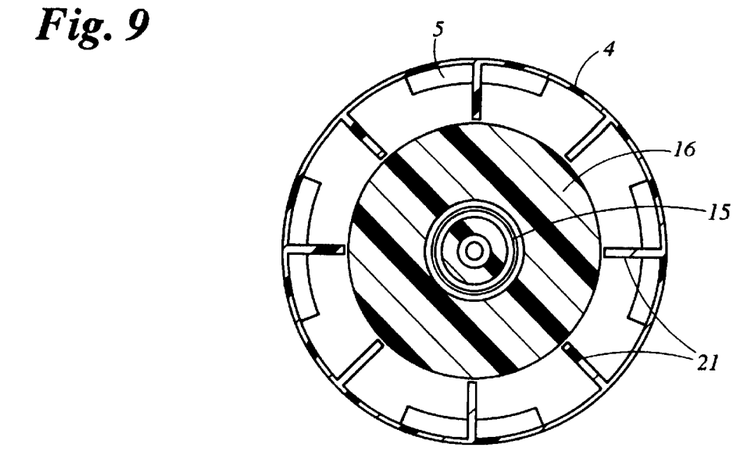
FIG. 9 is a sectional view taken along the line I—I in FIG. 8.

In the example shown in FIGS. 8 and 9, a plurality of vertical ribs 21 (eight ribs in this case) are provided so as to project from the inside circumferential surface of the casing 4 in a radially oriented configuration. These ribs are used as a guide for the float instead of the cylinder which is the guide 17 for the float 16 in the example shown in FIG. 2; and the bottom surface of a coil spring 14 is placed on the upper ends of the vertical ribs 21. This structure makes it possible to accommodate a larger float 16 in a casing 4 of the same size, so that the opening-and-closing sensitivity of the valve is correspondingly increased.

Figure 10:
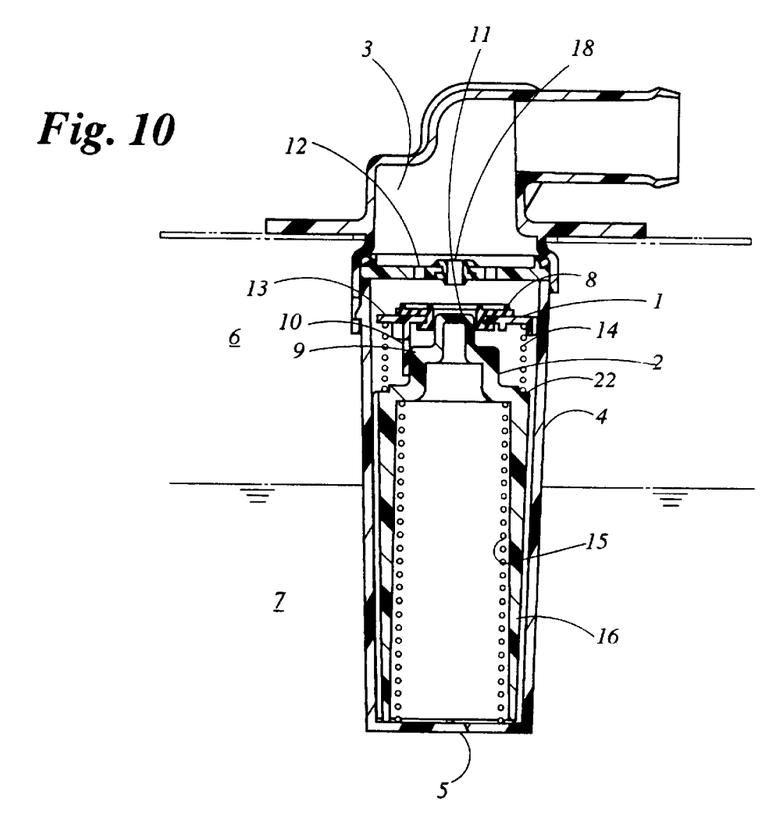
FIG. 10 is a longitudinal sectional view thereof showing a state in which both the main valve and auxiliary valve are open.
Figures 11, 12:
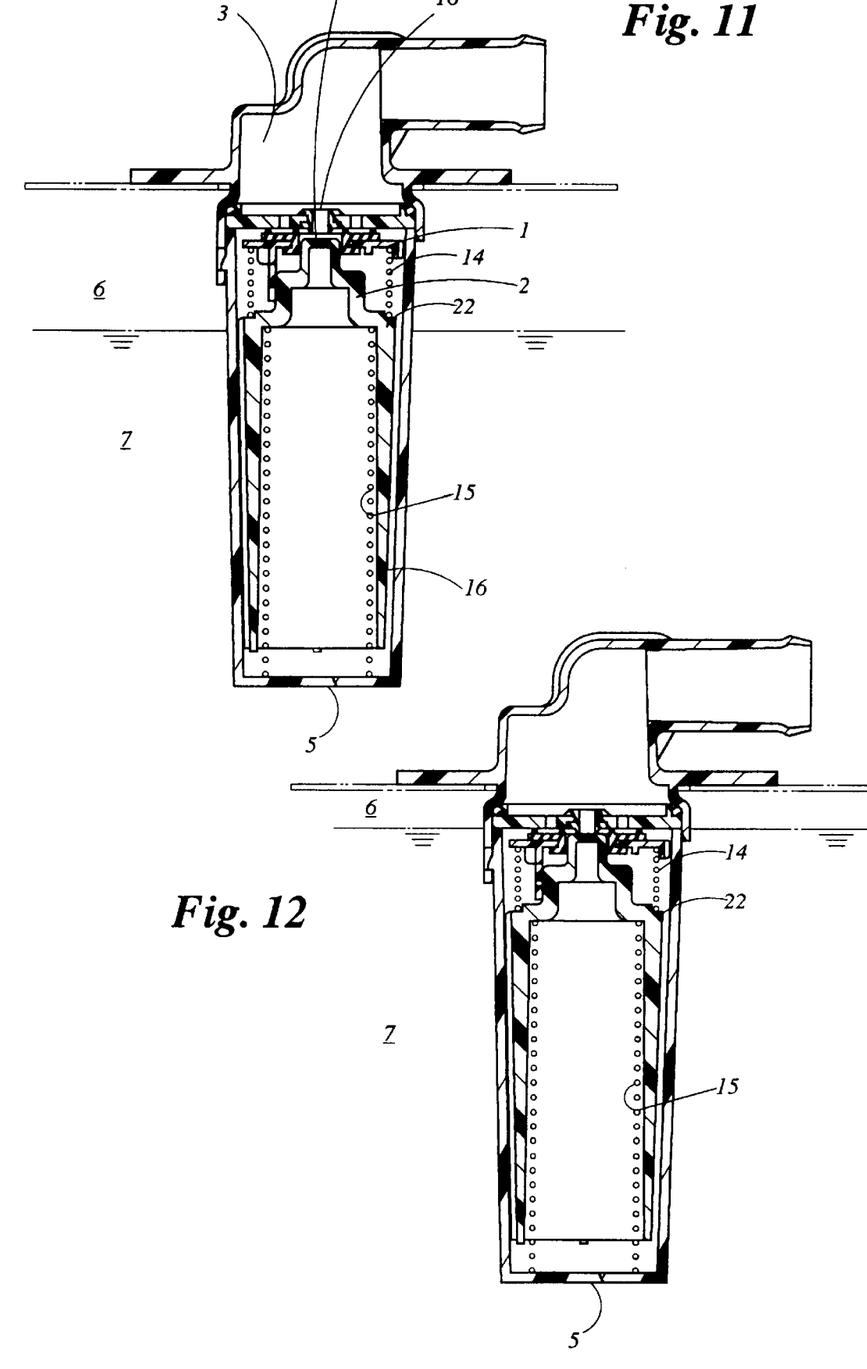
FIG. 11 is a longitudinal sectional view showing a state in which the main valve is closed and the auxiliary valve is open in another example thereof.
FIG. 12 is a longitudinal sectional view showing a state in which both the main valve and the auxiliary valve are closed in another example thereof.

The example shown in Figures 10 through 12 is a fuel interruption means in which a large float 16 can be accommodated, filling the entire interior of the casing, even though the casing 4 has a smaller diameter. More specifically, FIG. 10 is a perpendicular cross-sectional view of a fuel interruption means in which the diameter of the casing 4 is reduced by installing a coil spring 14 between the shoulder 22 of the float 16 and the undersurface of the main valve 1, showing a perpendicular cross-sectional view in which both the main valve 1 and the auxiliary valve 2 are open. FIG. 11 illustrates a state in which the main valve 1 is closed and the auxiliary valve 2 is open, and FIG. 12 illustrates a state in which both the main valve 1 and the auxiliary valve 2 are closed. The movements of the main valve 1 and auxiliary valve 2 are exactly the same as in the first example shown in FIG. 1.

By way of the present invention, a main valve and an auxiliary valve, which act accurately and reliably in response to fluctuations in the liquid fuel, function as respective independent valves, and the effect of pivot motion of the auxiliary valve to the main valve is suppressed so that the inflow of liquid fuel into the canister can be more or less completely prevented, thus improving the reliability of operation in a fuel interruption means.

In structural terms, the main valve seat and auxiliary valve seat are separated, and the area of surface contact between the main valve and auxiliary valve is merely eliminated. Accordingly, there are relatively few differences between the fuel interruption means of the present invention and a conventional fuel interruption means. As a result, a production line for the fuel interruption means of the present invention can be obtained by slightly modifying a conventional production line; and the present invention has such an advantage that a product having an improved performance can be manufactured with a small plant investment. Furthermore, for the same reasons, manufacturing costs are relatively low.

We claim:
1. A fuel interruption means for a fuel tank comprising a main valve, an auxiliary valve, a main valve seat and an auxiliary valve seat provided coaxially with said main valve seat in an upper portion of a casing and wherein said main valve comprises a disc having a central bore, said auxiliary valve moves in and out of said central bore to engage said auxiliary valve seat and said auxiliary valve which is caused to move upward and downward by a float and said main valve which moves upward and downward in linkage with said upward and downward movement of said auxiliary valve are accommodated inside said casing which allows an inflow and outflow of liquid fuel and is provided at an end of a passage that connects said fuel tank to a canister; a linking projection is provided on said auxiliary valve; and a projection regulating groove is provided on said main valve so that said main valve moves in linkage with said auxiliary valve in an action which is either advanced or retarded within a predetermined range; and said linking projection is inserted into said projection regulating groove so that said projection can change a position thereof within said range; and said auxiliary valve and said main valve are opened independently against said auxiliary valve seat and said main valve seat in said upper portion of said casing.

2. A fuel interruption means for a fuel tank according to claim 1, wherein said main valve is driven upward by a spring which is installed between an under surface of said main valve and a shoulder of said float, said float is combined with said auxiliary valve, said projection regulating groove formed in said main valve is caused to engage with said linking projection formed in said auxiliary valve so that said main valve is pushed downward under ordinary conditions, and when an amount of liquid fuel inside said fuel tank increases, or when a wave action is generated in a surface of said liquid fuel, said float causes said auxiliary valve to rise so that an engagement between said linking projection and projection regulating groove is released, thus causing said main valve to be lifted by said spring.

* * * * *